Sept. 13, 1960 L. KUNZMANN 2,952,119
DETACHABLE ELASTIC LINKAGE
Filed Feb. 29, 1956 2 Sheets-Sheet 1
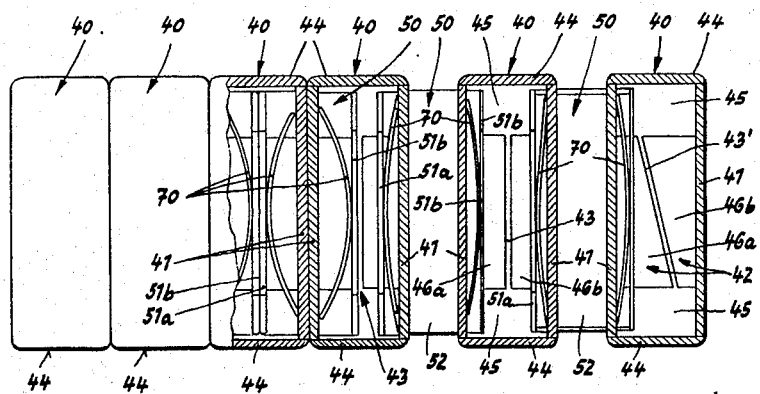
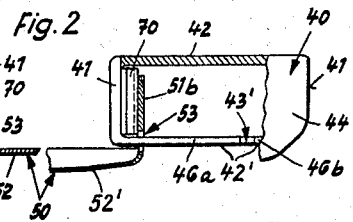
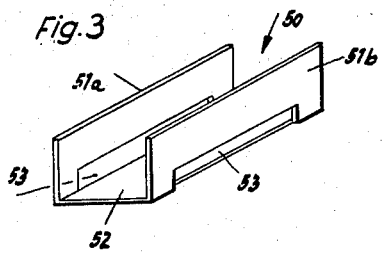
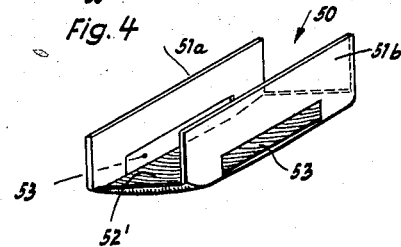
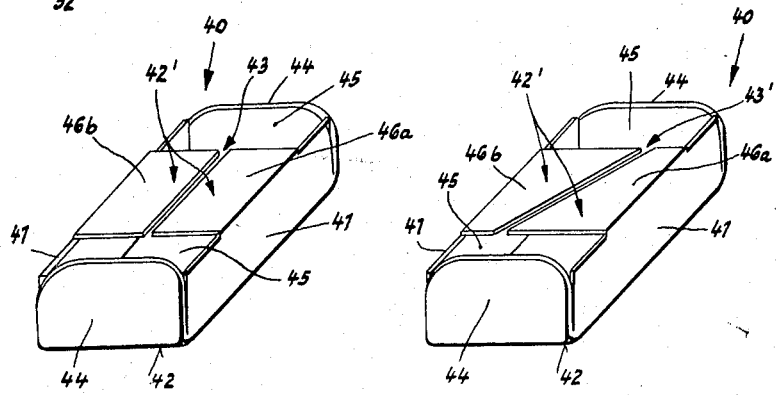
INVENTOR:
Ludwig Kunzmann
BY:
Michael S. Striker
agt.

Sept. 13, 1960  L. KUNZMANN  2,952,119
DETACHABLE ELASTIC LINKAGE
Filed Feb. 29, 1956  2 Sheets-Sheet 2

INVENTOR:
Ludwig Kunzmann
BY:
Michael S. Striker
agt.

2,952,119

DETACHABLE ELASTIC LINKAGE

Ludwig Kunzmann, Pforzheim, Baden, Germany, assignor to Rodi & Wienenberger, Aktiengesellschaft, Baden, Germany Filed Feb. 29, 1956, Ser. No. 568,650

Claims priority, application Germany Jan. 30, 1956

5 Claims. (Cl. 59—79)

The present invention relates to improvements in elastic link chains, and more particularly in expansion bracelets to be used as an article of jewelry and as a watch bracelet.

The invention relates particularly to such elastic chains or bracelets in which the individual links form sleevelike elements of any suitable shape, preferably substantially rectangular, which are disposed transverse to the longitudinal direction of the chain or bracelet, and in which springs are provided which are compressible in the direction in which the chain or bracelet is designed to expand, and which are mounted between the transverse walls of the individual sleeve-like links and parts of intermediate link elements which connect two adjacent sleevelike links and extend into the same.

Prior to this invention, link chains or bracelets of the type as above described have already been known in which the intermediate link elements were designed to form U-shaped connecting members, the two arms of which engaged into the cross-sectional openings of adjacent links which were provided at the longitudinal edges of the chain or bracelet. The arms of the U-shaped connecting members then either acted upon small inserted leaf springs or they themselves were designed to form springs. In order to prevent these connecting members, which were inserted from both longitudinal edges of the bracelet into the openings in the sleeve-like links, from falling out, either two opposite members were combined with each other to form a ring or they were secured in the links in such a manner that the ends of the arms of these connecting members snap under spring action into suitable detents or the like. In either case, however, the connecting members could not be subsequently removed, or only by means of special tools, if it was necessary to increase or reduce the normal length of the chain or bracelet. If the connecting members were covered or secured by bent-over lugs projecting from the upper walls of the sleeve-links, such lugs had to be unbent and could then hardly ever be bent back without affecting the appearance of the bracelet. In such bending they would often even break off entirely. Also, if such a bracelet was twisted or bent in a direction transverse to the direction of expansion thereof, the bent-over lugs easily became unbent by the U-shaped connecting members underneath so that the bracelet likewise depreciated in value and appearance.

The known link chains or bracelets of this type have the further disadvantage that, when the bracelet is expanded, unsightly gaps are formed between the individual sleeve links which ruins the appearance of a continuous unitary band. In order to overcome this disadvantage, elastic link chains or bracelets have previously been designed in which two superimposed layers of sleeve links were provided which were staggered relative to each other to the extent of one-half of the width of a sleeve link. However, such two-layer link designs according to previous proposals had the great disadvantage that the thickness of the bracelet became too large, thus giving it a heavy, clumsy appearance.

It is an object of the present invention to provide an expansion link chain or bracelet which is considerably thinner than the previous two-layer link designs mentioned above, and in which, moreover, the gaps which form between the individual sleeve links when the bracelet is extended will be covered so as to retain the continuous, unitary appearance of the bracelet.

Another object of the present invention is to provide a bracelet of the type as described in which the connecting members between the individual sleeve links are designed so that, without requiring any parts of the bracelet to be bent or unbent, these members may be easily unhooked from the adjacent sleeve links at any desired point of the bracelet and be reconnected just as easily to another sleeve link after a few links have been added or removed.

A further object of the invention is to provide such a bracelet as described in which the connecting members between adjacent sleeve links may, on the other hand, not become unintentionally unhooked or loosened.

Another object of the invention is to provide a bracelet which does not have the sharp edges which were prevalent in previous bracelets of this general type but in which the edges are well-rounded and smooth on all sides.

A further object of the invention is the provision of a link chain or bracelet which gives as much as possible the appearance of a continuous unitary band, regardless of whether the bracelet is extended or contracted.

Still another and very important object of the invention consists in the provision of an expansion bracelet, the individual parts of which are designed so as to be made and assembled very easily and at a low expense, and to be efficiently mass-produced entirely by automatic machinery.

A feature of the present invention for carrying out the above-mentioned objects consists in the provision of a link chain or bracelet of the general type as described which consists of sleevelike links, subsequently referred to as "sleeves," and intermediate members which connect the adjacent sleeves and are provided with small plate springs therein which act, and may be flattened, in the direction in which the bracelet expands. The new bracelet is particularly distinguished from those previously known by the fact that one of the two outer walls of each individual sleeve, i.e. those walls which connect the side walls thereof, is provided with a slot which extends transverse to the direction in which the bracelet expands and permits the insertion of those parts of the intermediate connecting members which engage into the sleeves. Each of these connecting members is offset with respect to the sleeves to the extent of the width of one-half sleeve, and is made in the shape of an open box, the bottom of which extends transverse to the length of the bracelet and closely engages with the outer walls of the two adjacent sleeves, while the side walls of these boxlike members engage into the sleeves and are of a height substantially corresponding to the inner height of the sleeves. These side walls are separated from the bottom plate of each connecting member by slots which extend along the side walls directly adjacent the bottom edge thereof, and in which the mentioned outer wall portions of the sleeves are able to slide while engaging with the bottom plate of the connecting members. According to the invention, these bottom plates may also be stamped so as to bulge outwardly like a trough so that the outer surface and particularly the edges thereof will be smoothly rounded.

Another feature of the invention thus consists in providing the connecting member of substantially U-shaped cross section and with open ends, and covering these open ends by means of ears or lugs which form a part of the sleeves and are produced by bending over the two ends of one of the outer walls of the sleeves so as to give the sleeves a substantially boxlike shape.

In one embodiment of the invention which incorporates this feature, the connecting member with such open ends likewise has a bottom wall and a pair of side walls, and a slot with closed ends in each side wall directly adjacent to and parallel with the bottom wall. Each boxlike sleeve adjacent to such connecting member has two side walls and two outer walls and a pair of end walls, which, as previously stated, are formed by bending over the longer ends of one of the outer walls. The opposite outer wall is provided with an aperture or cutout at each end thereof and extending from one side wall to the other, and a narrow slot in the remaining outer wall portion and extending from one aperture to the other. The apertures are made of a size so that the remaining central portions of the slotted outer wall are of a length so as to correspond substantially with the length of the slot in each longitudinal edge portion of the sleeves. The sleeves and connecting members may then be assembled by inserting each side wall of the connecting members through the narrow slot in the adjacent sleeve so that the respective outer wall portion of the sleeve will then pass through the slot in the connecting member, and such wall portion will then be guided in such slot in the connecting member and between the end walls of such slot for sliding movement of the side wall of the connecting member within the sleeve and along the surfaces of the opposite outer walls of the sleeve when the bracelet is being expanded or contracted.

In another embodiment of the invention which incorporates the feature of connecting members with open ends and sleeves of a boxlike shape with bent-over closed ends as previously described, each side wall of a connecting member has a pair of slots extending inwardly from the opposite open ends of the member directly adjacent to and parallel with the bottom wall. Each of the sleeves is provided with a central aperture or cut out in the outer wall opposite to the wall, the ends of which are bent over to form the end walls. Just like the two apertures in the embodiment as previously described, this single central aperture extends from one side wall to the other and has a width substantially corresponding to the width of the central portion of each side wall intermediate the two slots therein. The two remaining portions of the outer wall at both sides of the aperture are again provided with a narrow slot. For assembling the adjacent sleeves and connecting members, the side wall of one connecting member is inserted into a sleeve through the two slots in the outer wall thereof so that the mentioned central portion of such side wall between the two slots therein is slidably guided between the opposite edges of the aperture in the sleeve.

Another feature of the invention is designed to prevent the connecting members from becoming unintentionally unhooked from the adjacent sleeves. For this purpose, the slot in the outer wall of the sleeve may be made of a width exactly equal to the thickness of the material of the connecting member or even slightly smaller than such thickness. For inserting or removing the connecting member from the sleeve, the side walls of the sleeve, due to their resiliency by not being secured to the end walls thereof, may be slightly sprung apart sufficiently to allow the side wall of the connecting member to pass through the slot.

Another feature of the invention for preventing the connecting members from becoming unintentionally unhooked from the sleeves consists in providing each of the outer walls of the sleeves with a slot which extends at such an angle relative to the bent edges of the sleeve that the side walls of the connecting members may be inserted into or unhooked from the sleeves only if the bracelet is bent over sharply in a direction transverse to its length. Such a design has the additional advantage that the springs in the individual links of the new bracelet do not have to be secured but may be inserted between the side walls of the connecting members and the transverse walls of the sleeves in the form of loose leaf springs. These springs will be held in place within the sleeves by means of the end walls of the boxlike connecting members which cover up the open ends of the sleeves. The leaf springs will thus be retained in their proper position and be prevented from sliding out of the sleeves.

Still another modification of this safety feature of the invention is applicable to the embodiment previously described in which each sleeve is provided with a central aperture in one of its outer walls. In this modification, only one of the remaining outer wall portions next to the aperture needs to be provided with an oblique slot, while the other outer wall portion may either be provided with a straight slot, that is, one which extends vertically to the direction of expansion of the bracelet, or without any slot, or with a slot, the edges of which engage each other so that, in effect the slot will be closed. In order to insert the side wall of a connecting member into an adjacent sleeve of such design, one slotted end of the side wall is first inserted by twisting the member relative to the sleeve about the longitudinal axis of the bracelet and by then passing such slotted end either through the straight slot or through the aperture and under the unslotted part of the outer wall, whereupon the connecting member is angled as described with respect to the previous embodiment to insert the other slotted wall portion of the connecting member through the inclined slot of the sleeve.

In either of the embodiments of the invention as previously described, curved leaf springs may be loosely retained within the sleeves between the side walls thereof and the side walls of the two adjacent connecting members within the sleeves. These springs may be inserted into the sleeves through the mentioned apertures and slots in the slotted outer wall thereof, and preferably prior to the time the side walls of the adjacent connecting members are inserted.

Further objects, features, and advantages of the present invention will appear from the following detailed description thereof and from the accompanying drawings, in which—

Figs. 1 to 6 show a first embodiment of the invention and Figs. 7 to 12 show a second embodiment;

Fig. 1 shows a top view, partly in section, of a part of a bracelet according to the first embodiment of the invention, with the members on the left side being illustrated in contracted position, and the members on the right side in expanded position;

Fig. 2 shows a side view, partly in section, of a portion of the bracelet according to Fig. 1 in a contracted position but on a more highly enlarged scale;

Fig. 3 shows an enlarged perspective view of one of the connecting members according to Figs. 1 and 2;

Fig. 4 shows a view similar to Fig. 3, but with the bottom wall of the connecting member rounded or bulging outwardly;

Fig. 5 shows an enlarged perspective view of a sleeve according to Figs. 1 and 2, but in an inverted position;

Fig. 6 shows a view similar to Fig. 5 of a modification of such sleeve;

Fig. 7 shows a top view, partly in section, of a part of a bracelet according to the second embodiment of the invention, with the members on the left side being illustrated in contracted position, and the members on the right side in expanded position;

Fig. 8 shows a side view, partly in section, of a portion of the bracelet according to Fig. 7 in a contracted position but on a more highly enlarged scale;

Fig. 9 shows an enlarged perspective view of one of the connecting members according to Figs. 7 and 8;

Fig. 10 shows a view similar to Fig. 9, but with the bottom wall of the connecting member rounded or bulging outwardly similar to Fig. 9;

Fig. 11 shows an enlarged perspective view of a sleeve according to Figs. 7 and 8, but in an inverted position; while Fig. 12 shows a view similar to Fig. 11 of a modification of such sleeve.

Figure 7:
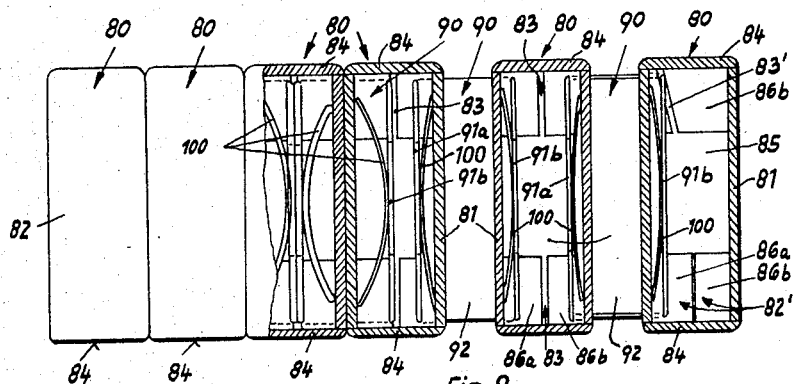
Figure 8:
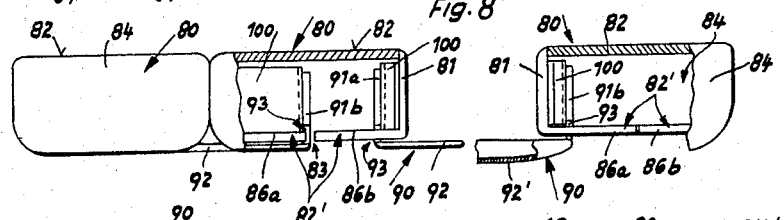

Referring to the drawings, the link chain or bracelet according to Figs. 7 and 8, but in an inverted position; embodiments as shown in Figs. 1 to 6 and 7 to 12, respectively, of individual sleeves 40 or 80, respectively, of substantially rectangular boxlike shape. When the bracelet is in fully contracted position, the side walls 41 or 81, respectively, of adjacent sleeves which face each other will be directly in engagement with each other. One outer wall 42, or 84, of each sleeve appearing in Figs. 5 and 6 or 11 and 12, respectively, as being the lower wall, but in the assembled bracelet actually forming the upper wall, is extended beyond the length of side walls 41 or 81, respectively. These extensions are then bent over and against the ends of the side walls so as to form end walls 44 or 84, respectively, the outer ends of which preferably extend slightly over the upper surface of the other outer wall 42′ or 82′, respectively, and are preferably rounded off as shown in the drawings. This outer wall 42′ or 82′, respectively, is provided with a narrow slot 43 or 83, respectively, which extends transversally to the direction of expansion of the bracelet and divides the wall into right and left outer wall portions 46a and 46b or 86a and 86b, respectively, as shown in Figs. 5 and 6 or Figs. 11 and 12, respectively.

The connecting members 50 or 90, as shown in Figs. 3 and 4 or 9 and 10, respectively, which are designed to connect the adjacent sleeves 40 or 80, respectively, are U-shaped and have open ends. The right and left side walls 51a and 51b or 91a and 91b, respectively, may be inserted through slots 43 or 83, of two adjacent sleeves 40 or 80, as shown in Figs. 1 and 2 or 7 and 8, respectively. The bottom walls 52 or 92, of connecting members 50 or 90, respectively, which connect the side walls 51a, 51b, or 91a, 91b of the adjacent sleeves will then lie, staggered by one-half of the width of a sleeve, in close engagement with the outer surfaces of the lower walls 42′ or 82′, respectively, of two adjacent sleeves and cover the gaps which are formed between the sleeves when the bracelet is being stretched, so that even in such stretched condition, the bracelet will retain its continuous, unitary appearance.

In order to enable the side walls of the connecting members to slide within the adjacent sleeves in the direction of expansion of the bracelet, the connecting member 50 of the embodiment as shown in Figs. 1 to 6 is provided in each side wall 51a and 51b and immediately adjacent and parallel with the bottom wall 52 with a slot 53 which is closed at both ends. On the other hand, the outer wall 42′ of sleeves 40 which is separated by slot 43 is provided with an aperture or cut-out 45 at each side thereof. The remaining central wall portions 46a and 46b of outer wall 42′ are of a length substantially corresponding to the length of slots 53 in the connecting members 50, so that they may pass through these slots of the adjacent connecting members and be guided by the walls or edges thereof when the bracelet is being expanded.

The bottom wall 52 of connecting members 50 may either be flat, as shown in Fig. 3, or bulging outwardly and curved, as shown at 52′ in Fig. 4, so that the outer surfaces and edges thereof will be rounded.

Slot 43 separating the two outer wall portions 46a and 46b of the sleeve may either extend parallel to the side walls 41, as shown in Fig. 5, or it may be inclined, as shown in Fig. 6. In the first case, slot 43 is preferably made of a width equal to or even slightly narrower than the thickness of either side wall 51a or 51b of the connecting member. This will prevent the connecting member 50 from slipping out of sleeve 40 unintentionally. Since the end walls of the sleeve 44 are not directly connected to side walls 41 thereof, these side walls will have a certain degree of resiliency so that they may be easily pried apart the small distance necessary to widen slot 43 sufficiently to insert or remove the side wall 51a or 51b. If the slot 43 of sleeve 40 should be inclined, as shown in Fig. 6, it may have a width equal to or even slightly wider than the thickness of side wall 51a or 51b since in this case it will be necessary to turn or twist connecting member 50 considerably relative to the adjacent sleeve 40 in a direction transverse to the longitudinal direction of the bracelet in order to insert or remove the respective side wall through such inclined slot 43. In either case, as shown in Fig. 5 or in Fig. 6, an accidental separation of the adjacent members will thus be safely prevented, while an intentional separation will only require minor dexterity.

It will also be of advantage if the width of the connecting members 50 between the outer surfaces of side walls 51a and 51b be made somewhat smaller than the width of the sleeves 40 so that the adjacent connecting members will not engage, but be slightly spaced from each other when the bracelet is fully contracted or released. This will avoid that any hairs on the hand or wrist will be caught between the adjacent side walls 51a and 51b of adjacent connecting members when the bracelet is slipped on the wrist. Such dimensioning of the connecting members has the further advantage that, if a sleeve 40 with a straight slot 43 is provided, the side walls 51a and 51b of the connecting member will then lie toward one side or the other of slot 43, regardless of whether the bracelet is in expanded or fully released position. Thus, even though slot 43 is as wide or even slightly wider than the thickness of side wall 51a or 51b of the connecting member, there will be no danger of an unintentional separation of the members. In order to separate them intentionally, it will then be necessary to stretch the bracelet and to push the respective connecting member back so far in a direction opposite to the direction of expansion that the edge of the respective side wall will coincide with slot 43 of the sleeve.

Figure 9:
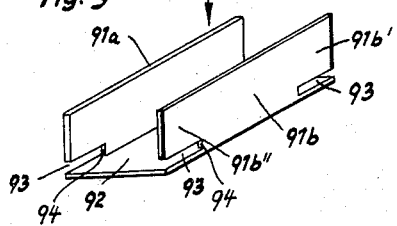
Figure 10:
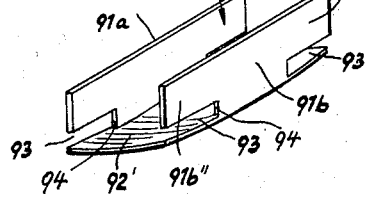

According to the second principal embodiment of the invention, as shown in Figs. 7 to 12, each side wall 91a and 91b of connecting members 90 is provided with a pair of slots 93 which are extending inwardly from the outer open ends and directly adjacent to and parallel with the edges of the bottom wall 92, as shown particularly in Figs. 9 and 10. In order to accommodate the central wall portion 94 intermediate slots 93, the lower slotted wall 82′ of sleeve 80 is provided with a central aperture or cut out 85, the walls or edges of which guide the central wall portion 94 of the connecting member 90 for sliding movement in the longitudinal direction of the bracelet when the side wall 91a or 91b of the connecting member is inserted into slot 83 or 83′ of the adjacent sleeve.

Figures 11, 12:
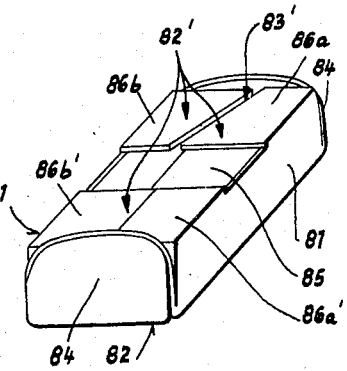

Similarly as in the embodiment of the invention shown in Figs. 1 to 6, the bottom wall of connecting member 90 may also be either flat, as shown at 92 in Fig. 9, or outwardly curving or bulging, as shown at 92′ in Fig. 10, so as to round off the outer surface and edges thereof. Also, similarly as described with reference to Figs. 5 and 6, slots 83 may either extend straight and parallel with side walls 81 along the center of the outer wall, thus dividing the same into wall portions 86a and 86b of equal width, or such slots may extend obliquely but in a straight line through the wall portions at both sides of aperture 85, similarly as shown in Fig. 6. Another modification, however, may consist of extending one of the two slots in a direction parallel with side walls 81 and the other at an oblique angle. Thus, even if the width of the slots should be made equal to or even slightly larger than the thickness of the material of side walls 91a and 91b of the connecting member, the one oblique slot 83' will prevent an accidental withdrawal of the respective side wall. The security against accidental separation of the members may be further increased if the straight slot between the two wall portions 86a and 86b at one side of the aperture 85 will be omitted entirely or be closed, as shown in Fig. 12, and only one oblique slot 83' be provided between the wall portions at the other side of aperture 85. If, for example, side wall 91b is then to be connected with or disconnected from a sleeve 80, the bracelet should be twisted transversely to the longitudinal direction thereof, whereupon one side only of the side wall, for example, the side 91b', may be inserted into or removed from the oblique slot 83', while the other side, for example, 91b'', of the side wall is then slipped under or withdrawn from the opposite unslotted outer wall portion 86a', 86b' of the sleeve. The two parts 86a' and 86b' of this wall portion need not be integral or even secured to each other, and their edges only need to abut against each other. This has the advantage that, like the sleeves of the other embodiments as previously described, this sleeve as shown in Fig. 12 may also be produced from flat sheet material by relatively simple and inexpensive stamping and bending operations and entirely by automatic machinery. However, if desired, this other wall portion 86a', 86b' may also be provided with an oblique slot which extends in the opposite direction to slot 83'.

In both embodiments of the invention as shown in Figs. 1 to 6 and 7 to 12, respectively, loose springs of bent shape 70 or 100, respectively, may be used. These springs will preferably be inserted into the sleeves prior to the insertion of the side walls of the connecting members and through the slots and apertures 43 and 45 or 83 and 85, respectively, so that they will be disposed between a side wall of the sleeve and a side wall of an adjacent connecting member.

Although the invention has been illustrated and described with reference to the preferred embodiments thereof, it should be understood that it is in no way limited to the details of such embodiments but is capable of numerous modifications within the scope of the appended claims. Particularly, it is to be understood that certain features of one embodiment as illustrated and described may also be applied to the other embodiment.

What I claim is:
1. A flexible expansible bracelet and the like comprising, in combination, a plurality of adjacently disposed sleeve members each having side walls, end walls, and outer and inner walls, said inner wall including a pair of wall portions having opposite free edges spaced from one another a predetermined distance to define an aperture adapted to receive a connecting member, said inner wall having cut-out means comprising at least one cut-out extending between the side walls substantially parallel to the end walls, said aperture communicating with said cut-out means forming an acute angle with respect to the longitudinal axis of its respective sleeve member, a plurality of channel-shaped connecting members each having a bottom wall and side walls and cooperable with said sleeve members, each of said side walls of said connecting member being provided with slot means receiving said inner walls of each pair of adjacently disposed sleeve members to releasably interlock the latter to one another with said side walls extending through said cut-out means and into said sleeve member, said respective connecting member in its interlocking position overlying said pair of adjacently disposed sleeve members, said aperture of said respective sleeve members permitting insertion and removal of a connecting member only if a side wall thereof is in alignment with and parallel to said aperture to define an acute angle with respect to the longitudinal axis of said sleeve member which is substantially equal to said acute angle between said aperture and said longitudinal axis, and spring means disposed between the respective side walls of said sleeve members and said connecting members.

2. A flexible expansible bracelet and the like according to claim 1, wherein said aperture extends substantially diagonally between opposite corners of a respective sleeve member.

3. A flexible expansible bracelet and the like according to claim 1, wherein said side walls of said sleeve member are free of connection with said end walls and are resilient so as to be laterally displaceable with respect to said longitudinal axis to vary the opening of said aperture by spacing said wall portions at a different predetermined distance from one another.

4. A flexible expansible bracelet and the like according to claim 3, wherein said end walls of said sleeve members are displaceable relative to said side walls.

5. A flexible expansible bracelet and the like according to claim 4, wherein said inner wall of each respective sleeve member further includes inwardly directed wall portions, each of which being provided with a front face which is substantially parallel to said side walls of its respective sleeve member.

References Cited in the file of this patent
UNITED STATES PATENTS

| | | |
|---|---|---|
| 914,533 | Thornton | Mar. 9, 1909 |
| 1,585,107 | Porte | May 18, 1926 |
| 1,621,205 | Jones | Mar. 15, 1927 |
| 1,659,438 | Nelson | Feb. 14, 1928 |
| 1,677,204 | Person | July 17, 1928 |
| 1,808,140 | Kestenman | June 2, 1931 |
| 2,074,046 | Ciner | Mar. 16, 1937 |
| 2,713,766 | Saccone | July 26, 1955 |

FOREIGN PATENTS

| | | |
|---|---|---|
| 254,086 | Germany | Nov. 21, 1912 |
| 213,632 | Great Britain | Apr. 11, 1924 |
| 927,774 | Germany | May 16, 1955 |